(12) United States Patent
Dienst et al.

(10) Patent No.: US 12,550,800 B2
(45) Date of Patent: Feb. 17, 2026

(54) DIVERTER SYSTEM FOR A CLOSING ASSEMBLY

(71) Applicant: CNH Industrial America LLC, New Holland, PA (US)

(72) Inventors: Johnathon Raymond Dienst, Maple Park, IL (US); Brian John Anderson, Yorkville, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 959 days.

(21) Appl. No.: 17/698,446

(22) Filed: Mar. 18, 2022

(65) Prior Publication Data

US 2023/0292643 A1    Sep. 21, 2023

(51) Int. Cl.
*A01B 63/00* (2006.01)
*A01C 5/06* (2006.01)

(52) U.S. Cl.
CPC ............ *A01B 63/008* (2013.01); *A01C 5/066* (2013.01)

(58) Field of Classification Search
CPC ..... A01B 33/087; A01B 61/046; A01B 63/00; A01B 63/002; A01B 63/008; A01C 5/066; A01C 7/206; A01C 7/203

USPC ................ 172/261, 264, 265, 260, 233, 234
See application file for complete search history.

(56) References Cited

U.S. PATENT DOCUMENTS

| | | |
|---|---|---|
| 3,347,188 A | 10/1967 | Richey |
| 4,878,443 A | 11/1989 | Gardner |
| 5,595,130 A | 1/1997 | Baugher et al. |
| 6,158,523 A | 12/2000 | Gengler et al. |
| 9,148,989 B2 | 10/2015 | Van Buskirk et al. |
| 2011/0108295 A1* | 5/2011 | Schilling ............... A01B 49/06 |
| | | 172/558 |
| 2015/0150188 A1* | 6/2015 | Stroot .................... A01C 11/02 |
| | | 111/105 |
| 2017/0034995 A1* | 2/2017 | Wilhelmi ................. A01C 7/20 |
| 2020/0337217 A1* | 10/2020 | Hodel .................... A01B 49/06 |

FOREIGN PATENT DOCUMENTS

GB          2072471         10/1981

* cited by examiner

*Primary Examiner* — Christopher J Sebesta
*Assistant Examiner* — Evan A Bregel
(74) *Attorney, Agent, or Firm* — Fletcher Yoder, P.C.

(57) ABSTRACT

A diverter system for a closing assembly includes a diverter configured to couple to an arm of the closing assembly. The diverter has an engagement surface configured to engage an obstacle within a field, and the diverter is configured to drive the arm upwardly in response to contact between the engagement surface and the obstacle to direct a closing disc of the closing assembly over the obstacle.

19 Claims, 7 Drawing Sheets

DIVERTER SYSTEM FOR A CLOSING ASSEMBLY

BACKGROUND

The present disclosure relates generally to a diverter system for a closing assembly.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit agricultural product (e.g., seed, fertilizer, etc.) at a desired depth beneath the soil surface of a field, thereby establishing rows of planted agricultural product. For example, each row unit typically includes a ground engaging tool or opener that forms a path (e.g., trench) for agricultural product deposition into the soil. An agricultural product conveying system (e.g., seed tube or powered agricultural product conveyor) is configured to deposit the agricultural product into the trench. The opener/agricultural product conveying system may be followed by a closing assembly that moves displaced soil back into the trench and a packing assembly that packs the soil on top of the deposited agricultural product. Furthermore, each row unit may include an agricultural product meter configured to control a flow of the agricultural product into the agricultural product conveying system, thereby controlling agricultural product spacing within the soil.

The closing assembly may include a pair of closing discs positioned on opposite sides of the trench. The closing discs engage the soil and are driven to rotate as the row unit moves along a direction of travel. Rotation of the closing discs drives the displaced soil into the trench, thereby covering the agricultural product with soil. The closing assembly may also include an arm that couples the closing discs to a frame of the row unit, and a biasing member (e.g., spring, etc.) may extend between the frame and the arm. The biasing member may urge the arm downwardly relative to the frame, thereby driving the closing discs into engagement with the soil. Unfortunately, during operation of the row unit, a rock within the field may become lodged between the pair of closing discs. The rock may be dragged through the field by the closing assembly, thereby disturbing soil coverage over the agricultural product. As a result, crop yield from the deposited agricultural product may be substantially reduced.

BRIEF DESCRIPTION

In certain embodiments, a diverter system for a closing assembly includes a diverter configured to couple to an arm of the closing assembly. The diverter has an engagement surface configured to engage an obstacle within a field, and the diverter is configured to drive the arm upwardly in response to contact between the engagement surface and the obstacle to direct a closing disc of the closing assembly over the obstacle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
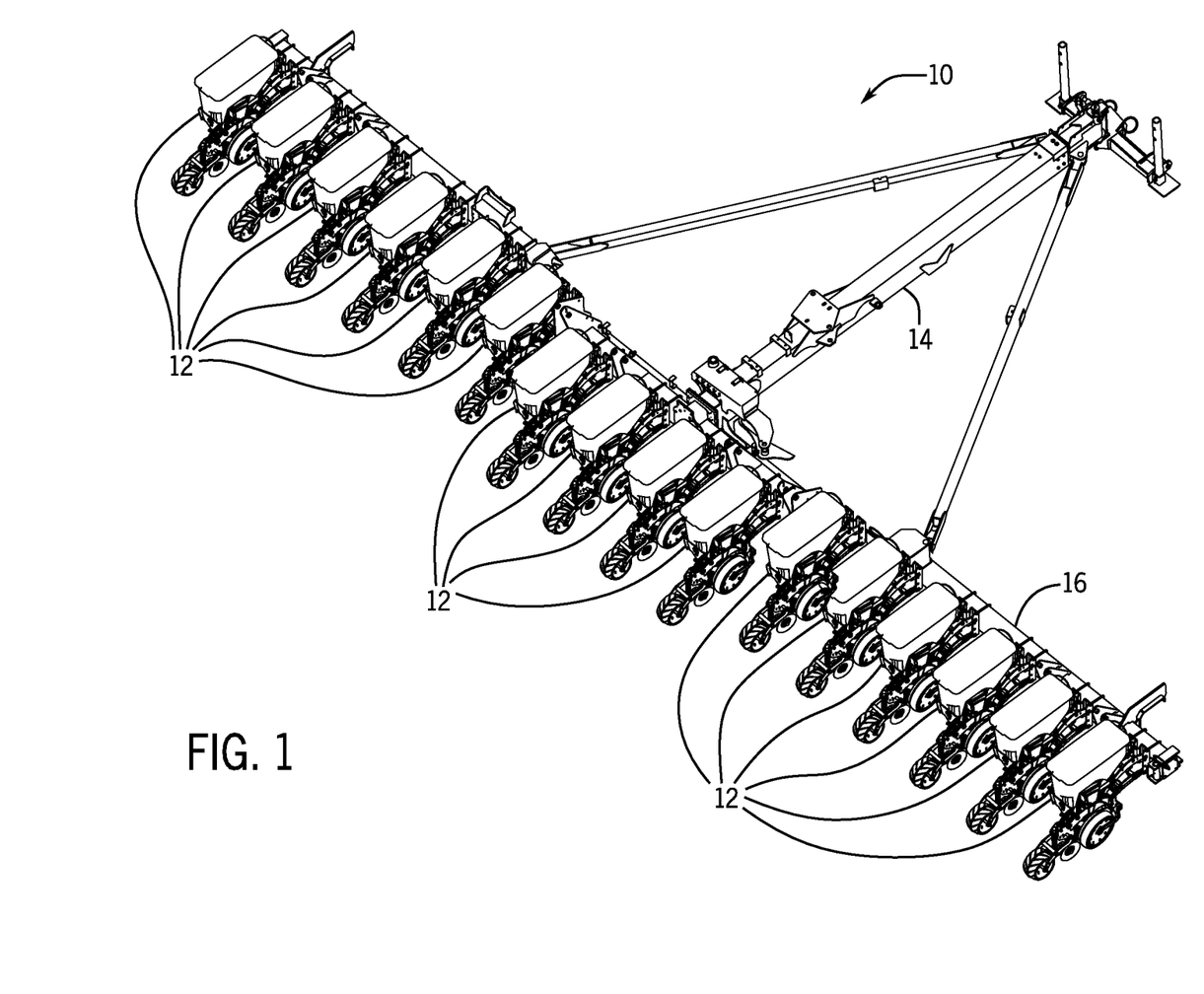
FIG. 1 is a perspective view of an embodiment of an agricultural implement having multiple row units distributed across a width of the agricultural implement.

FIG. 1 is a perspective view of an embodiment of an agricultural implement 10 (e.g., planting implement) having multiple row units 12 distributed across a width of the agricultural implement 10. The agricultural implement 10 is configured to be towed through a field behind a work vehicle, such as a tractor. As illustrated, the agricultural implement 10 includes a tongue assembly 14, which includes a hitch configured to couple the agricultural implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a path (e.g., trench) within soil of a field. The row unit 12 may also include an agricultural product conveying system (e.g., seed tube or powered agricultural product conveyer) configured to deposit agricultural product (e.g., seed, fertilizer, etc.) into the path/trench. In addition, the row unit 12 may include a closing assembly and a packing assembly positioned behind the agricultural product conveying system. The closing assembly is configured to move displaced soil back into the path/trench, and the packing assembly is configured to pack soil on top of the deposited agricultural product. Furthermore, the row unit 12 may include an agricultural product meter configured to control a flow of the agricultural product into the agricultural product conveying system, thereby controlling agricultural product spacing within the soil.

In certain embodiments, the closing assembly includes one or more closing discs configured to close the trench within the soil. The closing assembly also includes an arm configured to support the closing disc(s) and a biasing member coupled to the arm. The biasing member is configured to urge the closing disc(s) into the soil. Furthermore, the closing assembly includes a diverter system having a diverter coupled to the arm. The diverter has an engagement surface configured to engage an obstacle (e.g., rock, etc.) within the field, and the diverter is configured to drive the arm upwardly in response to contact between the engagement surface and the obstacle to direct the closing disc(s) over the obstacle. After the diverter passes over the obstacle, the biasing member may drive the closing disc(s) to reengage the soil. Because the diverter system is configured to drive the closing disc(s) to pass over an obstacle within the field, the possibility of the obstacle becoming lodged in the closing assembly is substantially reduced or eliminated. As a result, the possibility of soil disturbance caused by an obstacle lodged within the closing assembly may be substantially reduced or eliminated, thereby enhancing crop yield within the field.

Figure 2:
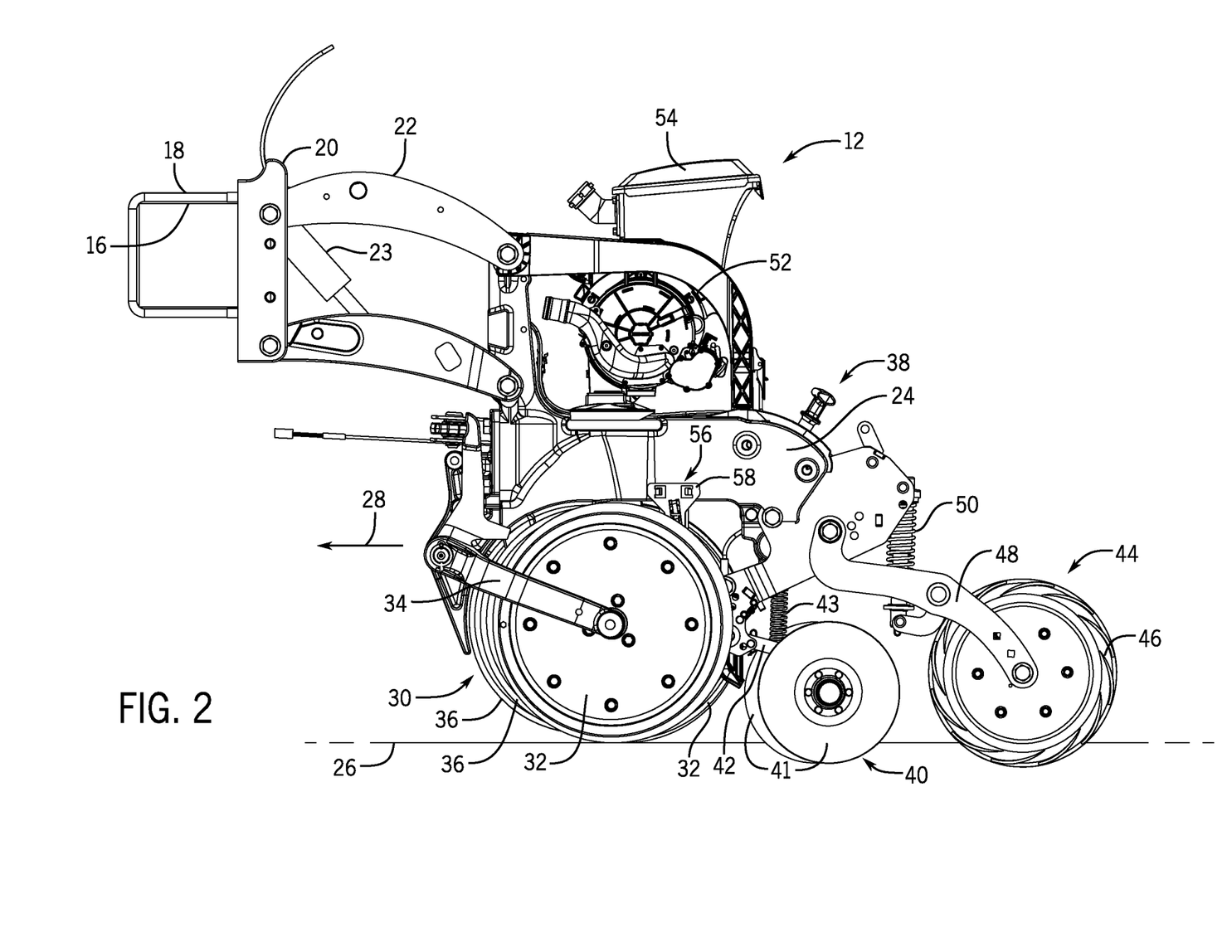
FIG. 2 is a side view of an embodiment of a row unit that may be employed on the agricultural implement of FIG. 1.

FIG. 2 is a side view of an embodiment of a row unit 12 (e.g., agricultural row unit) that may be employed on the agricultural implement of FIG. 1. The row unit 12 includes a mount 18 configured to secure the row unit 12 to the tool bar 16 of the agricultural implement. In the illustrated embodiment, the mount 18 includes a U-bolt that secures a bracket 20 of the row unit 12 to the tool bar 16. However, in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar 16 in response to variations in a soil surface 26. In the illustrated embodiment, an actuator 23 (e.g., hydraulic actuator, pneumatic actuator, electromechanical actuator, etc.) is configured to urge the frame 24 toward the soil surface 26. While the illustrated linkage assembly 22 is a parallel linkage assembly (e.g., a four-bar linkage assembly), in other embodiments, another suitable linkage assembly may extend between the bracket and the frame.

The row unit 12 is configured to deposit agricultural product (e.g., seed, fertilizer, etc.) at a target depth beneath the soil surface 26 as the row unit 12 traverses a field along a direction of travel 28. The row unit 12 includes an opener assembly 30 that forms a trench in the soil for agricultural product deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate a trench into the soil, and the gauge wheels 32 are configured to control a penetration depth of the opener discs 36 into the soil. In the illustrated embodiment, the row unit 12 includes a depth control system 38 configured to control the vertical position of the gauge wheels 32 (e.g., by blocking rotation of the arms in the upward direction beyond a selected orientation), thereby controlling the penetration depth of the opener discs 36 into the soil.

The row unit 12 also includes an agricultural product conveying system (e.g., seed tube or powered agricultural product conveyor) configured to deposit agricultural product (e.g., seed, fertilizer, etc.) into the trench. The opener assembly 30 and the agricultural product conveying system are followed by a closing assembly 40 that moves displaced soil back into the trench. In the illustrated embodiment, the closing assembly 40 includes two closing discs 41, and the closing discs 41 are positioned on opposite sides of the trench. The closing discs 41 engage the soil and are driven to rotate as the row unit 12 moves along the direction of travel 28. Rotation of the closing discs 41 drives the displaced soil into the trench, thereby covering the agricultural product with soil. The closing assembly 40 also includes an arm 42 that supports the closing disc(s) 41 and a biasing member 43 (e.g., spring, etc.) coupled to the arm 42. The biasing member 43 is configured to urge the closing disc(s) 41 into the soil. While the closing assembly 40 includes two closing discs 41 in the illustrated embodiment, in other embodiments, the closing assembly may include more or fewer closing discs (e.g., 1, 3, 4, or more).

In the illustrated embodiment, the closing assembly 40 is followed by a packing assembly 44 configured to pack soil on top of the deposited agricultural product. The packing assembly 44 includes a packer wheel 46, an arm 48 that pivotally couples the packer wheel 46 to the frame 24, and a biasing member 50 configured to urge the packer wheel 46 toward the soil surface 26, thereby driving the packer wheel to pack soil on top of the deposited agricultural product. While the illustrated biasing member 50 includes a spring, in other embodiments, the biasing member may include another suitable biasing device, such as a hydraulic cylinder or a pneumatic cylinder, among others. Furthermore, in certain embodiments, the packing assembly may be omitted.

The row unit 12 includes a vacuum agricultural product meter 52 configured to receive agricultural product (e.g., seed, fertilizer, etc.) from a hopper 54. In certain embodiments, the vacuum agricultural product meter 52 includes a disc having multiple openings. An air pressure differential between opposite sides of the disc induces the agricultural product (e.g., seed, etc.) to be captured within the openings. As the disc rotates, the agricultural product is conveyed toward the agricultural product conveying system. Once the agricultural product (e.g., seed, etc.) enters an outlet that extends to the agricultural product conveying system, the air pressure on each side of the disc is substantially equalized (e.g., at the end of a vacuum passage), thereby enabling the agricultural product (e.g., seed, etc.) to enter the agricultural product conveying system (e.g., seed tube or powered agricultural product conveyor). The agricultural product conveying system then directs the agricultural product to the trench. While the illustrated embodiment includes a vacuum agricultural product meter, in other embodiments, other suitable types of agricultural product meters may be utilized. As used herein, "vacuum" refers to an air pressure that is less than the ambient atmospheric air pressure, and not necessarily 0 pa.

In the illustrated embodiment, the row unit 12 includes a scraper assembly 56 having an outer scraper 58 coupled to the frame 24 and configured to engage an outer surface of an opener disc 36. Furthermore, in certain embodiments, the scraper assembly may include an inner scraper configured to engage an inner surface of the opener disc 36. The scraper assembly 56 is configured to remove accumulated soil from the opener disc 36, thereby enhancing the accuracy and efficiency of the seed path/trench forming process. Furthermore, in certain embodiments, the scraper assembly may include a second outer scraper and, in certain embodiments, a second inner scraper configured to remove accumulated soil from a second opener disc of the row unit.

As discussed in detail below, the closing assembly 40 includes a diverter system having a diverter coupled to the arm 42. The diverter has an engagement surface configured to engage an obstacle (e.g., rock, etc.) within the field. In addition the diverter is configured to drive the arm upwardly in response to contact between the engagement surface and the obstacle to direct the closing discs 41 over the obstacle. After the diverter passes over the obstacle, the biasing member 43 may drive the closing discs 41 to reengage the soil. Because the diverter system is configured to drive the closing discs 41 to pass over an obstacle within the field, the possibility of the obstacle becoming lodged in the closing assembly 40 is substantially reduced or eliminated. As a result, the possibility of soil disturbance caused by an obstacle lodged within the closing assembly may be substantially reduced or eliminated, thereby enhancing crop yield within the field.

Figure 3:
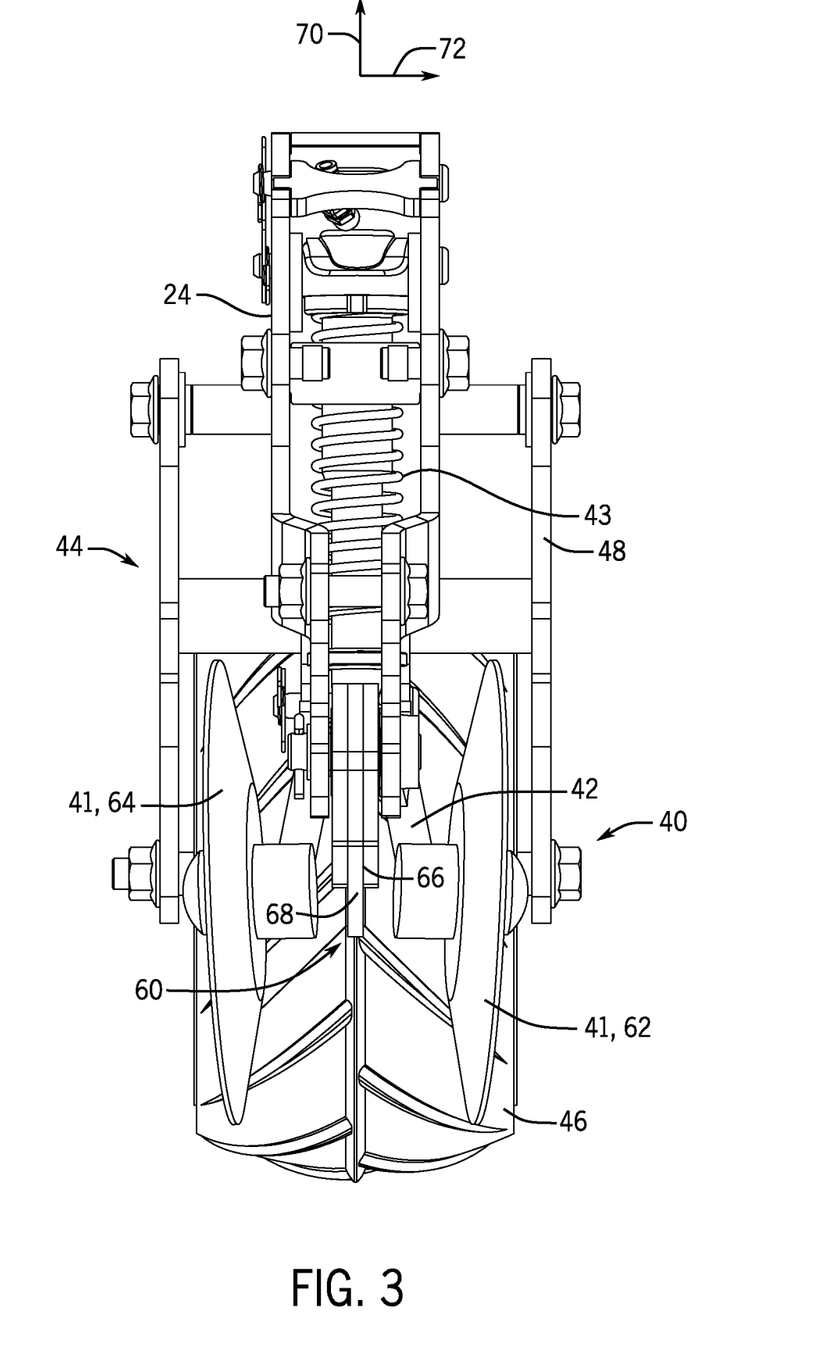
FIG. 3 is a front view of an embodiment of a closing assembly that may be employed within the row unit of FIG. 2, in which the closing assembly includes an embodiment of a diverter system.

FIG. 3 is a front view of an embodiment of a closing assembly 40 that may be employed within the row unit of FIG. 2, in which the closing assembly 40 includes an embodiment of a diverter system 60. In the illustrated embodiment, the closing assembly 40 includes a first closing disc 62 and a second closing disc 64. The first closing disc 62 is configured to be positioned on a first lateral side of the trench, and the second closing disc 64 is configured to be positioned on a second lateral side of the trench, opposite the first lateral side. As previously discussed, the closing discs 41 are configured to engage the soil and to be driven in rotation as the row unit moves along the direction of travel. Rotation of the closing discs drives the displaced soil into the trench, thereby covering the agricultural product with soil.

Furthermore, in the illustrated embodiment, a single arm 42 supports both closing discs 41. The arm 42 is pivotally coupled to the frame of the row unit, and each closing disc 41 is rotatably coupled to the arm 42. While the closing assembly 40 has a single arm 42 in the illustrated embodiment, in other embodiments, the closing assembly may have multiple arms, and each closing disc may be supported by a respective arm. In addition, the biasing member 43 is coupled to the arm 42 and to the frame 24 of the row unit. The biasing member 43 is configured to urge the arm downwardly, thereby urging the closing discs 41 into the soil. In embodiments including multiple arms, a respective biasing member may be coupled to each arm and configured to urge the arm downwardly. In the illustrated embodiment, the biasing member 43 includes a spring. However, in other embodiments, the biasing member may include any other suitable type of biasing element(s) (e.g., alone or in combination with the spring), such as a pneumatic cylinder, an air bag, a hydraulic cylinder, another suitable type of biasing element, or a combination thereof. Furthermore, while the biasing member includes a single biasing element in the illustrated embodiment, in other embodiments, the biasing member may include multiple biasing elements (e.g., of the same type and/or of different types).

In the illustrated embodiment, the diverter system 60 includes a diverter 66 coupled to the arm 42 of the closing assembly 40. The diverter 66 has an engagement surface 68 configured to engage an obstacle (e.g., rock, etc.) within the field. The diverter 66 is configured to drive the arm 42 upwardly along a vertical axis 70 in response to contact between the engagement surface 68 and the obstacle to direct the closing discs 41 of the closing assembly 40 over the obstacle. After the diverter 66 passes over the obstacle, the biasing member 43 may drive the closing discs 41 to reengage the soil. Because the diverter system 60 is configured to drive the closing discs 41 to pass over an obstacle within the field, the possibility of the obstacle becoming lodged in the closing assembly 40 is substantially reduced or eliminated. As a result, the possibility of soil disturbance caused by an obstacle lodged within the closing assembly may be substantially reduced or eliminated, thereby enhancing crop yield within the field.

In the illustrated embodiment, the diverter 66 is positioned between the first closing disc 62 and the second closing disc 64 along a lateral axis 72. For example, in certain embodiments, a lateral distance between the diverter 66 and the first closing disc 62 may be substantially equal to a lateral distance between the diverter 66 and the second closing disc 64. Positioning the diverter 66 between the closing discs 41 along the lateral axis 72 enables the diverter 66 to engage an obstacle that may otherwise become lodged between the closing discs. In embodiments in which the closing assembly includes a single closing disc, the diverter may be positioned adjacent to the closing disc along the lateral axis (e.g., on a left side or a right side of the closing disc). Furthermore, in embodiments in which the closing assembly includes three or more closing discs, the diverter may be positioned between any laterally opposing pair of closing discs.

Figure 4:
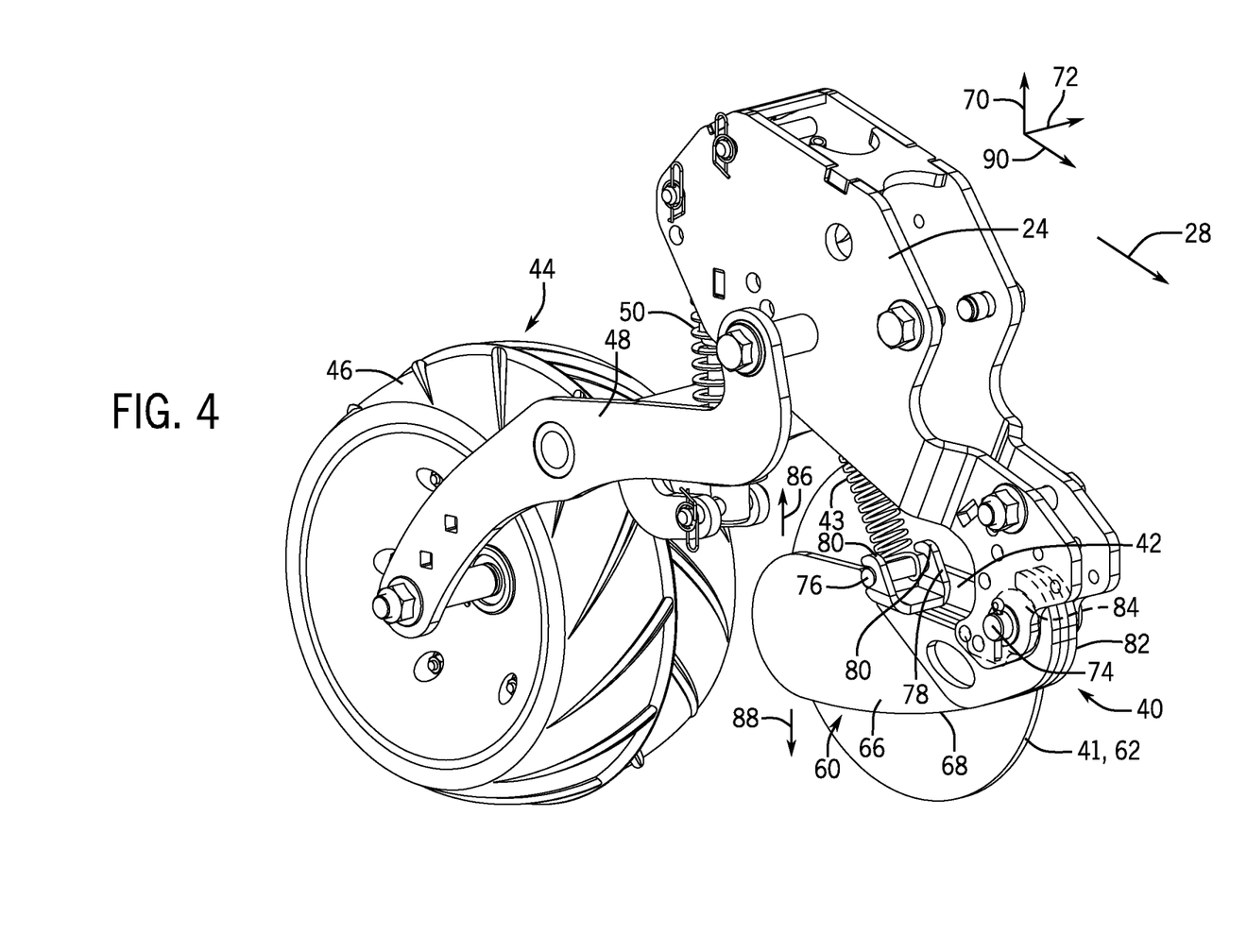
FIG. 4 is a perspective view of a portion of the closing assembly of FIG. 3.

FIG. 4 is a perspective view of a portion of the closing assembly 40 of FIG. 3. In the illustrated embodiment, the arm 42 is pivotally coupled to the frame 24 of the row unit by a pivot pin 74, and each closing disc 41 is rotatably coupled to the arm 42. Furthermore, the biasing member 43 (e.g., spring, etc.) is coupled to the row unit frame 24 and to the arm 42. As previously discussed, the biasing member 43 is configured to urge the arm 42 downwardly along the vertical axis 70, thereby urging the closing discs 41 into the soil. In the illustrated embodiment, the biasing member 43 is coupled to the arm 42 via a fastener 76 of the closing assembly 40. However, in other embodiments, the biasing member may be coupled to the arm by other suitable type(s) of connection(s) (e.g., alone or in combination with the fastener), such as a welded connection, an adhesive connection, a second fastener connection, other suitable type(s) of connection(s), or a combination thereof.

In the illustrated embodiment, the diverter system 60 includes a mount 78 coupled to the diverter 66. The mount 78 is configured to couple the diverter 66 to the arm 42 via engagement with the fastener 76 of the closing assembly 40. In the illustrated embodiment, the mount 78 includes curved sections 80 (e.g., hooks, etc.) configured to receive the fastener 76, thereby coupling the diverter 66 to the arm 42. The mount 78 may be coupled to the diverter 66 via any suitable type(s) of connection(s), such as welded connection(s), fastener connection(s), adhesive connection(s), a press-fit connection, other suitable type(s) of connection(s), or a combination thereof.

Furthermore, in the illustrated embodiment, the diverter 66 has a curved section 82 configured to extend about a portion of a boss 84 of the arm 42 to couple the diverter 66 to the arm 42. The pivot pin 74 extends through the boss 84 to rotatably couple the arm 42 to the row unit frame 24. In certain embodiments, the diverter system 60 may be coupled to the arm 42 of the closing assembly 40 by disposing the curved section 82 of the diverter 66 about a portion of the boss 84. The fastener 76 may then be disposed through the biasing member 43, the arm 42, and the curved sections 80 of the mount 78. In response to contact between the engagement surface 68 of the diverter 66 and an obstacle (e.g., rock, etc.) within the field, the diverter 66 may be driven to rotate relative to the row unit frame 24 in an upward direction 86 along the vertical axis 70. The coupling between the diverter 66 and the arm 42 drives the arm 42 to rotate about the pivot pin 74 in the upward direction 86, thereby directing the closing discs 41 of the closing assembly 40 over the obstacle. After the diverter 66 passes over the obstacle, the biasing member 43 drives the arm 42 to rotate about the pivot pin 74 in a downward direction 88 along the vertical axis 70, thereby driving the diverter 66 to rotate relative to the row unit frame 24 in the downward direction 88. As a result of the downward movement of the arm 42, the closing discs 41 may reengage the soil. Because the diverter system 60 is configured to drive the closing discs 41 to pass over an obstacle within the field, the possibility of the obstacle becoming lodged in the closing assembly 40 is substantially reduced or eliminated. As a result, the possibility of soil disturbance caused by an obstacle lodged within the closing assembly may be substantially reduced or eliminated, thereby enhancing crop yield within the field.

While the diverter 66 is coupled to the arm 42 via the curved section 82 of the diverter 66 and the mount 78 in the illustrated embodiment, in other embodiments, the diverter may be coupled to the arm via any other suitable type(s) of connection(s) (e.g., alone or in combination with the curved section and/or the mount), such as fastener connection(s), adhesive connection(s), a press-fit connection, welded connection(s), other suitable type(s) of connection(s), or a combination thereof. For example, in certain embodiments, the fastener coupling the biasing member to the arm may be omitted. In such embodiments, the mount may be omitted, and the diverter may be coupled to the arm via other suitable type(s) of connection(s). Furthermore, while the diverter includes the curved section configured to extend about a portion of the boss in the illustrated embodiment, in other embodiments, the curved section may be omitted, and the diverter may be coupled to the arm via other suitable type(s) of connection(s).

In the illustrated embodiment, the engagement surface 68 of the diverter 66 has a curved convex shape. The curved convex shape of the engagement surface 68 may facilitate upward movement of the diverter 66/arm 42 in response to engagement between the engagement surface 68 and the obstacle. While the engagement surface 68 has a curved convex shape in the illustrated embodiment, in other embodiments, the engagement surface may have a substantially straight shape. Furthermore, in the illustrated embodiment, the engagement surface 68 is angled downwardly along the direction of travel 28 while the arm 42 is in the illustrated working position. Accordingly, the engagement surface 68 is angled relative to a longitudinal axis 90 while the arm 42 is in the working position. While the arm 42 is in the illustrated working position, the closing discs 41 are engaged with the soil, and while the arm 42 is in a disengaged position, the closing discs 41 are disengaged from the soil.

Figure 5:
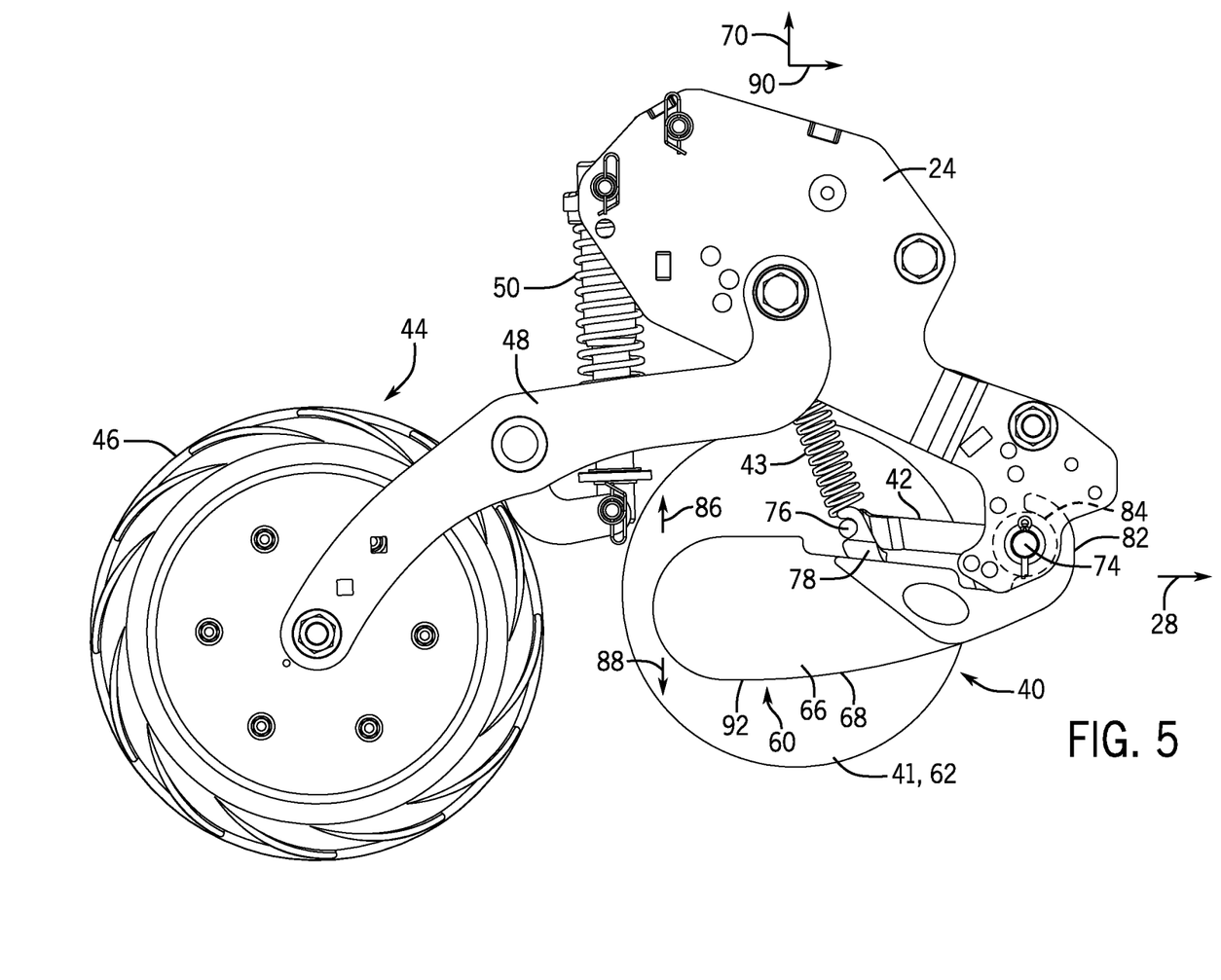
FIG. 5 is a side view of a portion of the closing assembly of FIG. 3, in which an arm of the closing assembly is in a working position.

FIG. 5 is a side view of a portion of the closing assembly 40 of FIG. 3, in which the arm 42 of the closing assembly 40 is in the working position. With the arm 42 in the illustrated working position, the closing discs 41 are engaged with the soil. In addition, a bottom 92 of the engagement surface 68 of the diverter 66 is positioned at or proximate to a surface of the soil. Accordingly, the diverter 66 does not significantly engage the soil, thereby substantially reducing or eliminating interference with the closing operation of the closing assembly 40. In addition, by positioning the bottom 92 of the engagement surface 68 at or proximate to the surface of the soil, the engagement surface 68 may engage smaller obstacles, thereby enabling the diverter system 60 to direct the closing discs 41 over the obstacles.

As previously discussed, the engagement surface 68 is angled downwardly along the direction of travel 28 while the arm 42 is in the illustrated working position. In addition, the diverter 66 is configured to drive the arm 42 in the upward direction 86 from the illustrated working position to the disengaged position in response to contact between the engagement surface 68 and an obstacle within the field, thereby directing the closing discs 41 of the closing assembly 42 over the obstacle. As previously discussed, with the arm 42 in the disengaged position, the closing discs 41 are disengaged from the soil. Because the diverter system is configured to drive the closing discs 41 to pass over an obstacle within the field, the possibility of the obstacle becoming lodged in the closing assembly 40 is substantially reduced or eliminated. As a result, the possibility of soil disturbance caused by an obstacle lodged within the closing assembly may be substantially reduced or eliminated, thereby enhancing crop yield within the field.

Figure 6:
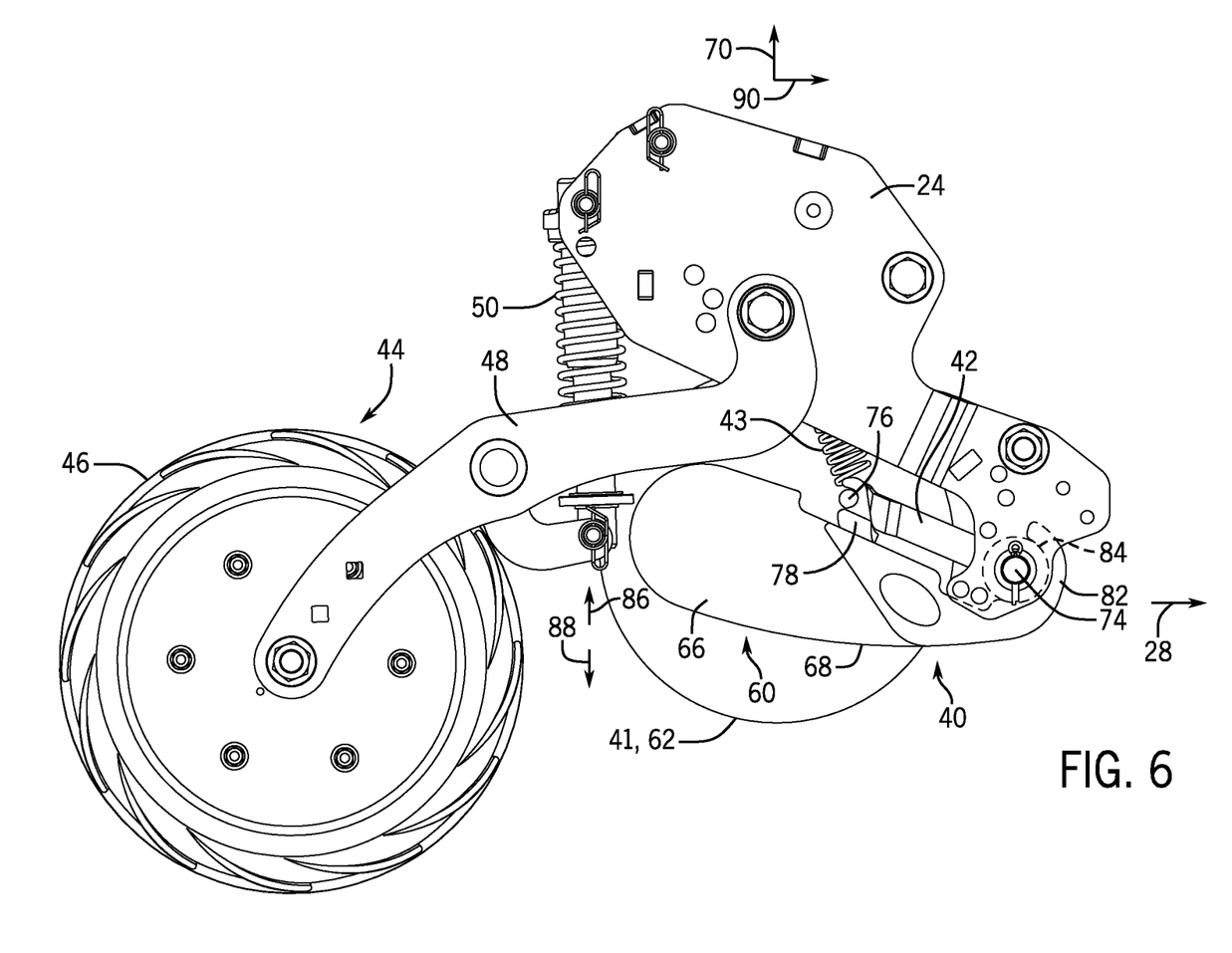
FIG. 6 is a side view of a portion of the closing assembly of FIG. 3, in which the arm of the closing assembly is in a disengaged position.

FIG. 6 is a side view of a portion of the closing assembly 40 of FIG. 3, in which the arm 42 of the closing assembly 40 is in the disengaged position. As previously discussed, with the arm 42 in the disengaged position, the closing discs 41 are disengaged from the soil. In addition, rotation of the arm 42 from the working position to the disengaged position further compresses the biasing member 43. Accordingly, after the diverter 66 passes over the obstacle, the biasing member 43 may drive the arm 42 to the working position, thereby driving the closing discs 41 to reengage the soil.

In the illustrated embodiment, the diverter 66 extends along a substantial portion of the longitudinal extent of the closing discs 41 (e.g., extent of the closing discs 41 along the longitudinal axis 90). Accordingly, contact between the engagement surface 68 and the obstacle may block movement of the arm 42 in the downward direction 88 until the closing discs 41 substantially clear the obstacle. As a result, the possibility of the obstacle becoming lodged in the closing assembly after the diverter passes over the obstacle is substantially reduced or eliminated. In certain embodiments, the diverter may extend along the longitudinal axis 90 to at least the center of the closing discs, to a region of the closing discs between the center and a rearward end, or beyond a rearward end of the closing discs.

Figure 7:
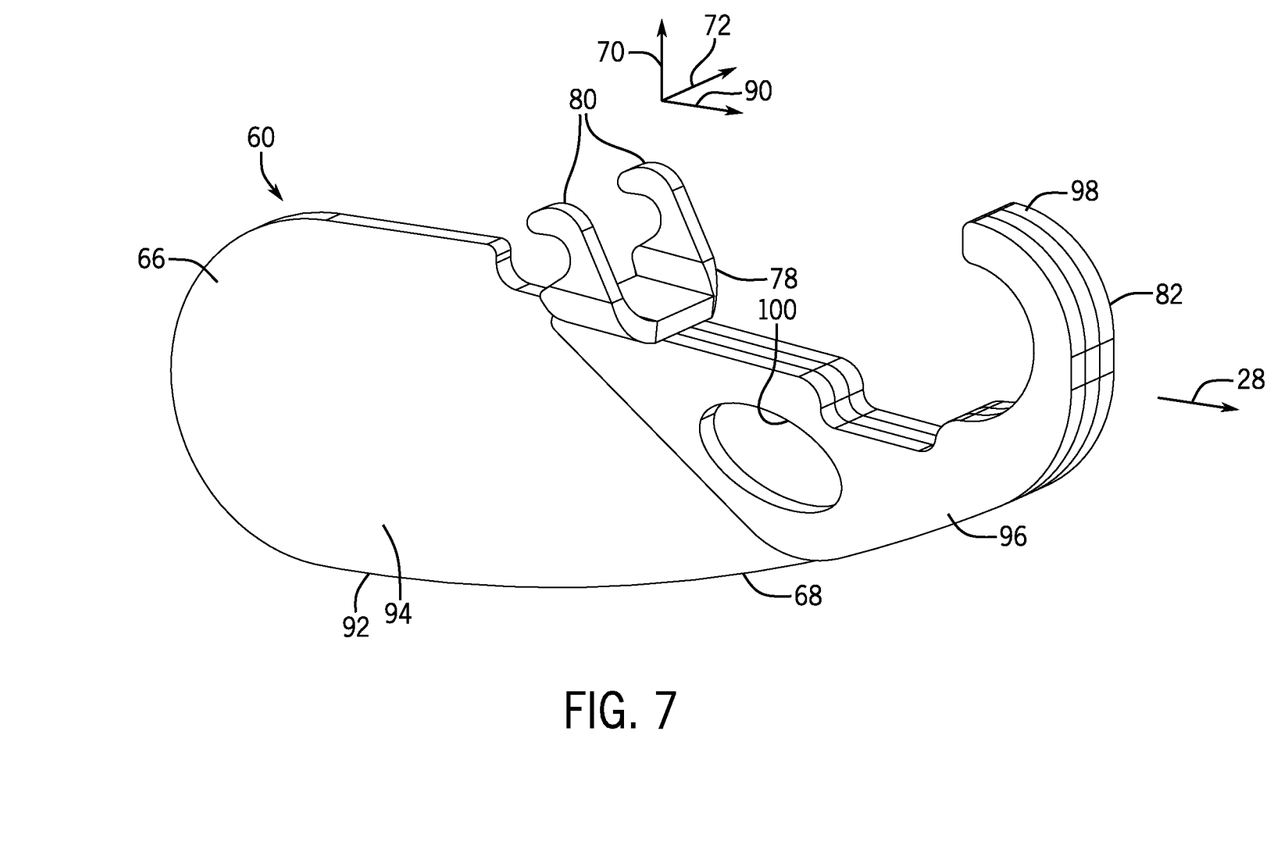
FIG. 7 is a perspective view of the diverter system of FIG. 3.

FIG. 7 is a perspective view of the diverter system 60 of FIG. 3. In the illustrated embodiment, the diverter 66 of the diverter system 60 includes a main plate 94, a first reinforcing plate 96, and a second reinforcing plate 98. As illustrated, the first reinforcing plate 96 is coupled to a first lateral side of the main plate 94 (e.g., first side along the lateral axis 72), and the second reinforcing plate 98 is coupled to a second lateral side of the main plate 94 (e.g., second side along the lateral axis 72), opposite the first lateral side. At least a portion of the engagement surface 68 is formed on the main plate 94. For example, the engagement surface 68 may be formed on the main plate 94 and, in certain embodiments, the first reinforcing plate 96 and/or the second reinforcing plate 98. In the illustrated embodiment, each reinforcing plate is coupled to the main plate 94 by welded connection(s). In addition, in the illustrated embodiment, each reinforcing plate has a respective opening 100 to facilitate the formation of at least one welded connection between the reinforcing plate and the main plate 94. For example, at least one welded connection between the reinforcing plate and the main plate 94 may be formed at the opening 100. While each reinforcing plate has a single respective opening 100 in the illustrated embodiment, in other embodiments, at least one reinforcing plate may have more or fewer openings (e.g., 0, 2, 3, 4, or more) to facilitate formation of the respective welded connection(s). For example, in certain embodiments, the opening in at least one reinforcing plate may be omitted.

While each reinforcing plate is coupled to the main plate 94 by welded connection(s) in the illustrated embodiment, in other embodiments, at least one reinforcing plate may be coupled to the main plate by other suitable type(s) of connection(s) (e.g., alone or in combination with the welded connection(s)), such as adhesive connection(s), a press-fit connection, fastener connection(s), other suitable type(s) of connection(s), or a combination thereof. Furthermore, while the diverter 66 includes two reinforcing plates in the illustrated embodiment, in other embodiments, the diverter may include more or fewer reinforcing plates (e.g., 0, 1, 3, 4, or more). For example, in certain embodiments, the reinforcing plates may be omitted. Furthermore, while the diverter 66 is formed from one or more plates in the embodiments disclosed above, in certain embodiments, the diverter may be formed from any other suitable structure(s) (e.g., alone or in combination with plate(s)). For example, in certain embodiments, the diverter may be formed from one or more wires (e.g., forming a wire frame), one or more molded components, one or more machined components, one or more additive manufactured components, other suitable structure(s), or a combination thereof. In addition, in certain embodiments, the diverter may include one or more wheels or discs rotatably coupled to the arm. The wheel(s)/disc(s) are configured to rotate along the surface of the soil, and each wheel/disc is configured to drive the arm upwardly in response to contact between an engagement surface (e.g., outer surface) of the wheel/disc and an obstacle (e.g., rock, etc.) to direct the closing discs of the closing assembly over the obstacle.

As previously discussed, the engagement surface 68 of the diverter 66 has a curved convex shape. The curved convex shape of the engagement surface 68 may facilitate upward movement of the diverter 66/arm in response to engagement between the engagement surface 68 and the obstacle. While the engagement surface 68 has a curved convex shape in the illustrated embodiment, in other embodiments, the engagement surface may have a substantially straight shape. Furthermore, in certain embodiments, the engagement surface may have multiple portions along a length (e.g., longitudinal extent) of the engagement surface, and at least two portions may have different shapes. For example, the engagement surface may have 1, 2, 3, 4, 5, 6, or more portions, and each portion may have a curved convex shape, a curved concave shape, a substantially straight shape, an irregular shape, a polygonal shape, or another suitable shape.

The diverter 66 may be formed from any suitable material(s). For example, in certain embodiments, the plates disclosed above may be formed from steel. In addition, in certain embodiments, at least one plate (e.g., all of the plates) may be formed from a polymeric material (e.g., nylon, polycarbonate, polyethylene, etc.). Furthermore, in certain embodiments, at least one component of the diverter may be formed from steel, aluminum, composite material(s) (e.g., including fiber glass, carbon fiber, etc.), polymeric material(s) (e.g., including nylon, polycarbonate, polyethylene, etc.), ceramic material(s), other suitable material(s), or a combination thereof.

Furthermore, while the diverter system disclosed above has a single diverter, in certain embodiments, the diverter system may include multiple diverters. For example, in certain embodiments, each closing disc may be coupled to the row unit frame by a respective arm. In such embodiments, a respective diverter may be coupled to each arm. For example, the diverter may be coupled to the arm and positioned laterally inward from a respective closing disc. Furthermore, as previously discussed, the diverter system may be coupled to the arm of the closing assembly by disposing the curved section of the diverter about the boss. The biasing member/arm fastener may then be disposed through the biasing member, the arm, and the curved sections of the mount. Accordingly, the diverter system may be easily coupled to existing closing assemblies. In addition, the diverter system may be easily removed from a respective closing assembly (e.g., for operation in certain soil conditions). Furthermore, while the diverter is removably coupled to the arm in the embodiments disclosed herein, in certain embodiments the diverter may be integrally coupled to the arm. For example, the arm and the diverter assembly may be formed from one or more common elements.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A diverter system for a closing assembly of an agricultural row unit, comprising:
    a diverter configured to couple to an arm of the closing assembly, wherein the arm is configured to pivotally couple to a frame of the agricultural row unit, the diverter has an engagement surface configured to engage an obstacle within a field, and the diverter is configured to drive the arm to pivot upwardly relative to the frame in response to contact between the engagement surface and the obstacle to direct a closing disc rotatably coupled to the arm over the obstacle;
    wherein the diverter is configured to couple to the arm at two separate locations with respect to a proximal-distal extent of the arm to cause the diverter to pivot with the arm relative to the frame.

2. The diverter system of claim 1, comprising a mount coupled to the diverter, wherein the mount is configured to couple the diverter to the arm at a first location of the two separate locations via engagement with a fastener of the closing assembly configured to couple a biasing member to the arm.

3. The diverter system of claim 2, wherein the mount has a curved section configured to extend about a portion of the fastener.

4. The diverter system of claim 1, wherein the diverter has a curved section configured to extend about a portion of a boss of the arm to couple the diverter to the arm at a second location of the two separate locations.

5. The diverter system of claim 1, wherein the engagement surface has a curved convex shape.

6. The diverter system of claim 1, wherein the diverter comprises a main plate, and at least a portion of the engagement surface is formed on the main plate.

7. The diverter system of claim 6, wherein the diverter comprises a first reinforcing plate coupled to a first lateral side of the main plate.

8. The diverter system of claim 7, wherein the diverter comprises a second reinforcing plate coupled to a second lateral side of the main plate, opposite the first lateral side.

9. A closing assembly of an agricultural row unit, comprising:
   a pair of closing discs configured to close a trench within soil;
   an arm configured to support the pair of closing discs, wherein the pair of closing discs is rotatably coupled to the arm, and the arm is configured to pivotally couple to a frame of the agricultural row unit;
   a biasing member coupled to the arm and configured to urge the pair of closing discs into the soil; and
   a diverter system comprising a diverter coupled to the arm, wherein the diverter is positioned between the pair of closing discs with respect to a lateral axis and overlaps the pair of closing discs with respect to a longitudinal axis, the diverter has an engagement surface configured to engage an obstacle within a field, and the diverter is configured to drive the arm to pivot upwardly relative to the frame in response to contact between the engagement surface and the obstacle to direct the pair of closing discs over the obstacle.

10. The closing assembly of claim 9, comprising a fastener coupling the biasing member to the arm, wherein the diverter system comprises a mount coupled to the diverter and engaged with the fastener to couple the diverter to the arm.

11. The closing assembly of claim 10, wherein the mount has a curved section configured to extend about a portion of the fastener.

12. The closing assembly of claim 9, wherein the diverter has a curved section extending about a portion of a boss of the arm to couple the diverter to the arm.

13. The closing assembly of claim 9, wherein the diverter comprises a main plate, and at least a portion of the engagement surface is formed on the main plate.

14. The closing assembly of claim 13, wherein the diverter comprises a reinforcing plate coupled to a lateral side of the main plate.

15. A diverter system for a closing assembly of an agricultural row unit, comprising:
   a diverter comprising a main plate configured to couple to an arm of the closing assembly, wherein the arm is configured to pivotally couple to a frame of the agricultural row unit, the diverter has an engagement surface configured to engage an obstacle within a field, at least a portion of the engagement surface is formed on the main plate, the engagement surface is configured to be angled downwardly along a direction of travel of the closing assembly while the arm is in a working position, and the diverter is configured to drive the arm to pivot upwardly relative to the frame from the working position to a disengaged position in response to contact between the engagement surface and the obstacle to direct a closing disc rotatably coupled to the arm over the obstacle;
   wherein the diverter is configured to couple to the arm at two separate locations with respect to a proximal-distal extent of the arm to cause the diverter to pivot with the arm relative to the frame.

16. The diverter system of claim 15, comprising a mount coupled to the diverter, wherein the mount is configured to couple the diverter to the arm at a first location of the two separate locations via engagement with a fastener of the closing assembly configured to couple a biasing member to the arm.

17. The diverter system of claim 15, wherein the engagement surface has a curved convex shape.

18. The diverter system of claim 15, wherein the diverter comprises a reinforcing plate coupled to a lateral side of the main plate.

19. The diverter system of claim 15, wherein the diverter has a curved section configured to extend about a portion of a boss of the arm to couple the diverter to the arm at a second location of the two separate locations.

* * * * *